(12) United States Patent
Wilkerson, Jr. et al.

(10) Patent No.: US 6,539,038 B1
(45) Date of Patent: Mar. 25, 2003

(54) REFERENCE FREQUENCY QUADRATURE PHASE-BASED CONTROL OF DRIVE LEVEL AND DC BIAS OF LASER MODULATOR

(75) Inventors: James Allan Wilkerson, Jr., Satellite Beach, FL (US); James Vincent Wernlund, Indialantic, FL (US); Alen Fejzuli, Palm Bay, FL (US); Stephen Philip Reddy, Melbourne, FL (US)

(73) Assignee: JDS Uniphase Corporation, San Jose, CA (US)

( * ) Notice: Subject to any disclaimer, the term of this patent is extended or adjusted under 35 U.S.C. 154(b) by 167 days.

(21) Appl. No.: 09/712,829

(22) Filed: Nov. 13, 2000

(51) Int. Cl.[7] ............................................... H10S 3/00
(52) U.S. Cl. .................. 372/38.02; 372/25; 372/26
(58) Field of Search ........................... 372/38, 25, 26

(56) References Cited

U.S. PATENT DOCUMENTS

| | | | |
|---|---|---|---|
| 4,981,359 A | * 1/1991 | Tazartes et al. | 356/350 |
| 5,003,264 A | 3/1991 | Koizumi et al. | 324/309 |
| 5,170,274 A | 12/1992 | Kuwata et al. | 359/182 |
| 5,208,817 A | 5/1993 | Kao et al. | 372/26 |
| 5,317,443 A | 5/1994 | Nishimoto | 359/187 |
| 5,343,324 A | 8/1994 | Le et al. | 359/184 |
| 5,400,417 A | 3/1995 | Allie et al. | 385/2 |
| 5,440,113 A | 8/1995 | Morin et al. | 250/205 |
| 5,453,608 A | 9/1995 | Conder et al. | 250/205 |
| 5,726,794 A | 3/1998 | Tajima | 359/249 |
| 5,742,268 A | 4/1998 | Noda | 345/84 |
| 5,805,328 A | 9/1998 | Satoh et al. | 359/245 |
| 5,850,409 A | * 12/1998 | Link | 372/38 |
| 5,900,621 A | 5/1999 | Nagakubo et al. | 250/205 |
| 5,907,426 A | 5/1999 | Kato et al. | 359/239 |
| 5,917,637 A | 6/1999 | Ishikawa et al. | 359/181 |

* cited by examiner

Primary Examiner—Paul Ip
Assistant Examiner—Leith Al-Nazer
(74) Attorney, Agent, or Firm—Allen, Dyer, Doppelt Milbrath & Gilchrist, P.A.

(57) ABSTRACT

A single reference tone/frequency-based control scheme adjusts the DC bias voltage and modulation signal drive level to an external X-cut lithium niobate Mach Zehnder modulator, in accordance with phase quadrature components of the output of the single tone frequency generator. A pair of phase quadrature feedback loops are coupled through a loop filter of a common feedback path electo-optically coupled to monitor the optical output of the laser modulator. Quadrature-phase (Q) and in-phase (I) frequency components are respectively coupled to respective Q and I channel phase detectors, coupled to synchronous demodulators for the Q and I channel feedback loops. The phase detectors produce respective error voltages that close Q and I channel feedback loops and control the optical extinction ratio and DC bias voltage of the modulator.

15 Claims, 1 Drawing Sheet

REFERENCE FREQUENCY QUADRATURE PHASE-BASED CONTROL OF DRIVE LEVEL AND DC BIAS OF LASER MODULATOR

FIELD OF THE INVENTION

The present invention relates in general to communication systems and components therefor, and is particularly directed to a reduced complexity method and apparatus for controlling the DC bias and modulation signal drive level to an external laser modulator, such as an X-cut lithium niobate (LN) Mach Zehnder (MZ) modulator, using phase quadrature components of a single reference frequency.

BACKGROUND OF THE INVENTION

A typical external laser modulator architecture for a digital optical transmitter, such as that employed for use in a very high data rate (e.g., on the order of 10 Gb/s or higher) communication system, is diagrammatically illustrated in FIG. 1 as comprising a laser modulator 10, such as an X-cut lithium niobate (LN) Mach Zehnder (MZ) modulator, that is external to and disposed in the output beam path 12 of a continuous wave laser 14. The LN MZ modulator 10 has a first, drive signal port 11 to which a digital drive signal is applied, and a second, DC bias port 13, to which a DC bias voltage is coupled. The drive signal is supplied from an output 23 of an analog driver 20, which has a signal input 21 coupled to a digital RF signal source 22 and a drive level (gain) control port 24 coupled to receive a drive amplitude control voltage. The DC bias voltage is supplied from an output 33 of a bias controller 30, which has a DC voltage input 31 coupled to receive a DC control voltage.

In an effort to sustain long-term, stable operation of the laser modulator 10, compensating for environmental effects, such as temperature and aging—which is especially important for telecom and datacom applications, the DC control voltage to the DC bias controller 30 is coupled to a first reference oscillator tone-based closed loop control path 35, that monitors the beam output of the laser modulator, and adjusts the control voltage input to the bias controller 30, as necessary, to ensure that the DC voltage bias necessary for proper modulator operation is coupled to DC bias port. In addition, in order for the modulator drive signal to track changes in the modulation efficiency slope, a second, reference oscillator tone-based closed loop control path 25 is coupled to monitor the output of the laser modulator. This second closed loop control path is operative to controllably adjust the DC input to the analog driver 20, in order to maintain a constant optical extinction ratio of the modulator.

Because this conventional architecture employs two different tones/frequencies for signal drive control and DC bias adjustment, not only are two different control channel circuits required, but they must include filter/isolation circuitry that successfully reduces/minimizes interaction or cross-coupling of one control channel into the other. For an illustration of non-limiting examples of patent literature describing prior art laser modulator architectures, including a dual tone mechanism of the type employed in FIG. 1, attention may be directed to the following U.S. patents: U.S. Pat. Nos. 5,317,443; 5,742,268; 5,805,328; 5,917,637; 5,907,426; 5,400,417; 5,003,264; 5,343,324; 5,453,608; 5,900,621; 5,440,113; 5,170,274; 5,208,817; and 5,726,794.

SUMMARY OF THE INVENTION

In accordance with the present invention, shortcomings of conventional laser modulator control stabilization schemes, including those employed in the systems of the above-referenced patent literature, are effectively obviated by controlling the DC bias and modulation signal drive level to an external LN MZ laser modulator, using relatively orthogonal laser output monitoring feedback control loops associated with phase quadrature components of a single reference frequency tone. A signal driver to which a digital RF signal is applied is coupled to receive a drive amplitude control voltage from the output of an associated phase detector of a Q-channel synchronous detector feedback loop. In addition, a DC bias controller is coupled to receive a DC control voltage from the output of an associated phase detector of an I-channel synchronous detector feedback loop.

Each feedback loop is coupled through a loop filter of a common feedback path is electro-optically coupled to monitor the optical output of the laser modulator. The Q and I channel synchronous detector feedback loops are referenced to phase-quadrature tone components of a single frequency/tone generator. The quadrature-phase and in-phase frequency components are respectively coupled to the respective Q and I channel phase detectors, which are also coupled to the outputs of synchronous demodulators for the Q and I channel feedback loops. The phase detectors produce respective error voltages that close Q and I channel feedback loops and control the optical extinction ratio and DC bias voltage of the modulator.

The Q channel and I channel synchronous demodulators are coupled to the output of a loop filter of an opto-electronic detector path, which monitors the modulated optical output beam from the laser modulator. A monitored photo-current is coupled to a transimpedance amplifier, which provides an output voltage signal representative of the monitored optical signal, and couples that signal through a loop filter to the Q and I channel synchronous demodulators. The outputs of the Q and I channel synchronous demodulators are compared in their associated phase detectors with their respective relative quadrature reference tones sourced from the tone generator. The phase detectors produce respective DC control voltages to the modulation signal driver and the DC bias controller for controllably adjusting the operation of the laser modulator, so as to drive the respective phase differences of the quadrature tone signal components applied to the two phase detectors to or very close to a null condition. Namely, both a constant optical extinction ratio and DC biasing of the laser modulator to compensate for variations in environmental conditions are simultaneously realized by means of a single reference tone generator, which reduces the circuit complexity necessary to minimize mutual interaction of the two control channels.

DETAILED DESCRIPTION

Figure 1:
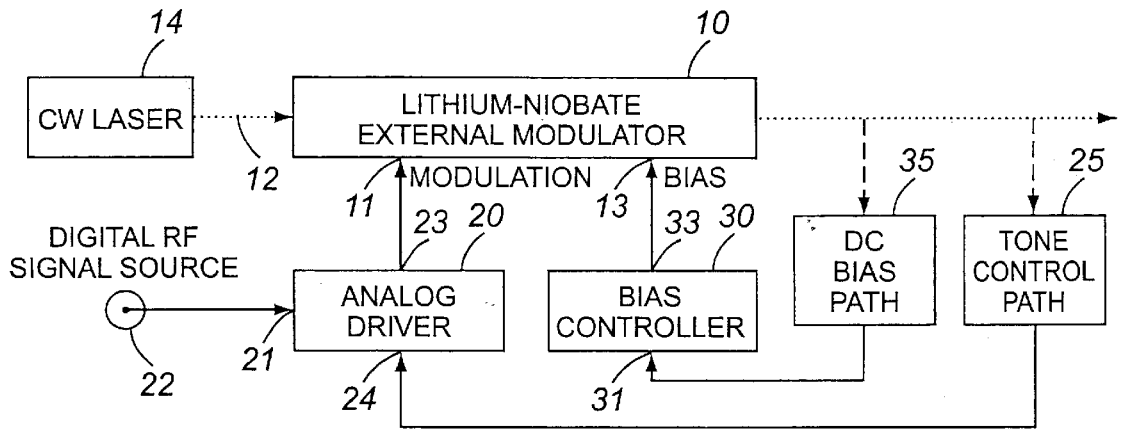
FIG. 1 diagrammatically illustrates a conventional laser modulator architecture, having respectively different tone-based, closed loop control paths for adjusting signal drive and DC bias inputs to the modulator.

Before describing in detail the new and improved single reference frequency tone, quadrature phase-based, laser modulator control architecture of the present invention, it should be observed that the invention resides primarily in prescribed modular arrangements of conventional opto-electronic and electronic circuits and components. In a practical implementation that facilitates their incorporation with existing laser modulators used in high data rate telecommunication equipment and the like, these modular arrangements may be readily implemented in an application specific integrated circuit (ASIC) chip.

Consequently, the configuration of such arrangements of circuits and components and their operation have, for the most part, been illustrated in the drawings by a readily understandable block diagram, which shows only those specific details that are pertinent to the present invention, so as not to obscure the disclosure with details which will be readily apparent to those skilled in the art having the benefit of the description herein. Thus, the diagrammatic illustrations are primarily intended to show the major components of the invention in a convenient functional grouping, whereby the present invention may be more readily understood.

Figure 2:
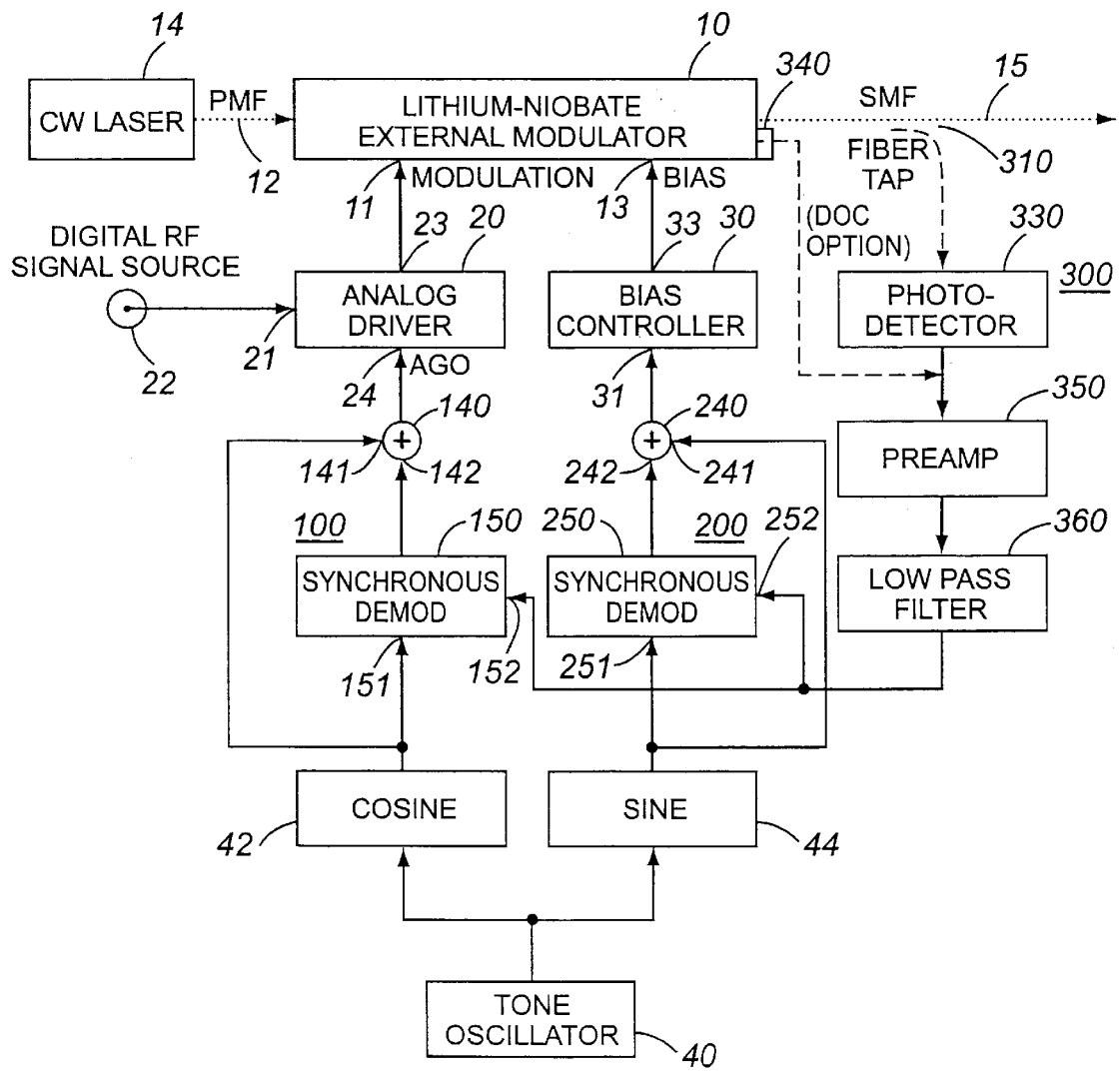
FIG. 2 diagrammatically illustrates the configuration of a single reference tone, quadrature phase-based, laser modulator control architecture of the present invention.

The overall configuration of the laser modulator control architecture of the present invention is shown diagrammatically in FIG. 2 as comprising a laser modulator 10, such as an X-cut lithium niobate (LN) Mach Zehnder (MZ) modulator, referenced above, which is arranged in output beam path 12 of continuous wave laser 14. The LN MZ modulator 10 has a modulation drive port 11 to which a digital RF drive signal is supplied from an analog signal driver 20, and a DC bias port 13, to which a DC bias voltage is coupled from a bias controller 30. Analog driver 20 is coupled to receive a digital RF signal from a signal input port 22, and a drive amplitude control voltage from a phase detector 140 of a first (Q-channel) synchronous detector feedback loop 100. The DC bias controller 30 is coupled to receive a DC control voltage from a phase detector 240 of a second (I-channel) synchronous detector feedback loop 200.

The Q and I channel synchronous detector feedback loops 100 and 200 are referenced to phase-quadrature tone components of a common frequency or tone generator 40, so as to provide relatively orthogonal signal processing paths for minimizing or avoiding mutual interference between the loops. For this purpose, the output of the frequency/tone generator 40 (such as a 100 Hz tone signal) is split via cosine and sine coupling circuits 42 and 44 into quadrature-phase (Q) and in-phase (I) frequency components, that are respectively coupled to first inputs 151, 251 of Q channel and I channel synchronous demodulators 1i50 and 250. In addition, the quadrature-phase (Q) and in-phase (I) frequency components are respectively coupled to first inputs 141 and 241 of phase detectors 140 and 240, second inputs 142 and 242 of which are coupled to the outputs of the synchronous demodulators 150 and 250. Phase detectors 140 and 240 produce respective DC error voltages that close the respective Q and I channel feedback loops and control the optical extinction ratio and modulator bias voltage of the modulator.

Second inputs 152, 252 of the Q channel and I channel synchronous demodulators 150 and 250 are coupled to the output of a loop filter 360 of an opto-electronic detector path 300, which is coupled to monitor the average optical power within the modulated optical output beam 15 from the laser modulator 10. As a non-limiting example, the modulated output beam 15 may be monitored by means of a fiber optic coupler 310 installed in a (single mode) fiber optic link carrying the output beam, and arranged to feed the extracted portion of the output beam to a photo detector 330. Alternatively, a direct optical input sensor, such as a diode-on-chip (DOC) detector 340 installed within the modulator housing, may be employed. The photo-current output of the sensing element is coupled to a transimpedance preamplifier 350, which provides an output voltage signal representative of the monitored optical signal, and couples that signal through the loop filter 360 to the synchronous demodulators 150 and 250.

In operation, the outputs of the Q and I channel synchronous demodulators 150 and 250 are compared in phase detectors 140 and 240 with their respective relative quadrature phase reference tones sourced from the same tone generator 40. The phase detectors supply respective DC voltages that control the operation of analog driver 20 and bias controller 30 in a manner that drive the tone signal differences (errors) applied to the phase detectors 140 and 240 to zero or a null condition. Thus serves to simultaneously compensate for variations in environmental conditions, and enables the modulator drive signal to track changes in the modulation efficiency slope, by means of a single reference tone generator, which reduces the circuit complexity necessary to minimize mutual interaction of the two control channels.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed:

1. A method of controlling the operation of a laser modulator that is adapted to be installed in the laser light beam path of a laser, and having a signal modulation port to which a modulation drive signal is coupled, and a bias port to which a DC bias level is coupled, said method comprising the steps of:

(a) monitoring a modulated output beam of said laser modulator and generating an output signal representative of said modulated output beam; and (b) controlling said signal drive signal and said DC bias level to said laser modulator in accordance with said output signal and phase quadrature components of a prescribed frequency signal.

2. A method according to claim 1, wherein step (b) comprises coupling said output signal to a first synchronous detector feedback loop for a first of said phase quadrature components of said prescribed frequency signal to derive a first DC output associated with a first phase error of said output signal relative to said first of said phase quadrature components of said prescribed frequency signal, and coupling said output signal to a second synchronous detector feedback loop for a second of said phase quadrature components of said prescribed frequency signal to derive a second DC output associated with a second phase error of said output signal relative to said second of said phase quadrature components of said prescribed frequency signal, and controlling said signal drive signal and said DC bias controlling said DC bias level in accordance with said first and second DC outputs, respectively.

3. A method according to claim 2, wherein step (b) comprises controlling said signal drive signal and said DC bias level in a manner that minimizes said first and second phase errors.

4. A method according to claim 2, wherein step (b) comprises controlling said first DC output so as to maintain a substantially constant optical extinction ratio of said laser modulator.

5. A method according to claim 1, wherein said laser modulator comprises a lithium niobate Mach-Zehnder laser modulator.

6. An apparatus for controlling the operation of a laser modulator, that is adapted to be installed in the laser light beam path of a laser, and having a signal modulation port to which a laser modulator drive signal from a modulator driver is coupled, and a DC bias level port to which a DC bias level is coupled, comprising:

an optical detector that is operative to monitor a modulated output beam of said laser modulator and generate an output signal representative of said modulated output beam;

a frequency signal generator which is operative to generate a reference frequency signal; and a control unit which is operative to control operation of said modulator driver and said DC bias level, in accordance with said output signal and respective/phase quadrature components of said reference frequency signal generated by said frequency signal generator.

7. An apparatus according to claim 6, wherein said control unit includes a first synchronous detector feedback loop for a first of said phase quadrature components of said prescribed frequency signal, that produces a first DC output associated with a first phase error of said output signal relative to said first of said phase quadrature components of said prescribed frequency signal for controlling operation of said modulator driver, and a second synchronous detector feedback loop for a second of said phase quadrature components of said prescribed frequency signal that produces a second DC output associated with a second phase error of said output signal relative to said second of said phase quadrature components of said prescribed frequency signal for controlling said DC bias level.

8. An apparatus according to claim 7, wherein said control unit is operative to control said modulation driver and said DC bias level so as to minimize said first and second phase errors.

9. An apparatus according to claim 7, wherein said modulation driver is operative to control said first DC output so as to maintain a substantially constant optical extinction ratio of said laser modulator.

10. An apparatus according to claim 7, wherein said laser modulator comprises a lithium niobate Mach-Zehnder laser modulator.

11. An apparatus for controlling the operation of a laser modulator that modulates the laser light beam output from a laser to produce a modulated laser beam, said laser modulator having a signal modulation port to which a laser modulator drive signal from a modulator driver is coupled, and a DC bias level port to which a DC bias level from a DC bias controller is coupled, said apparatus comprising:

an optical detector that monitors said modulated laser beam and produces an output signal representative of said modulated laser beam;

a frequency signal generator which generates a first reference frequency signal and a second reference frequency signal, said second reference frequency signal having the same frequency as said first reference frequency signal and being in phase quadrature with respect to said first reference frequency signal; and a control unit which controls said modulator driver and said DC bias level, in accordance with said output signal produced by said optical detector and said first and second reference frequency signals generated by said frequency signal generator.

12. The apparatus according to claim 11, wherein said control unit includes a first synchronous detector feedback loop coupled between said optical detector and said modulator driver, and being coupled to receive said first reference frequency signal, said first synchronous detector feedback loop being operative to produce a first DC output associated with a first phase error of said output signal relative to said first reference frequency signal for controlling operation of said modulator driver, and a second synchronous detector feedback loop coupled between said optical detector and said DC bias controller for controlling said DC bias level, and being coupled to receive said second reference frequency signal, said second synchronous detector feedback loop being operative to produce a second DC output associated with a second phase error of said output signal relative to said second reference frequency signal for controlling operation of said DC bias controller.

13. The apparatus according to claim 12, wherein said control unit is operative to control said modulation driver and said DC bias level so as to minimize said first and second phase errors.

14. An apparatus according to claim 12, wherein said modulation driver is operative to control said first DC output so as to maintain a substantially constant optical extinction ratio of said laser modulator.

15. An apparatus according to claim 12, wherein said laser modulator comprises a lithium niobate Mach-Zehnder laser modulator.

\* \* \* \* \*